(12) United States Patent
Liu et al.

(10) Patent No.: US 9,647,744 B2
(45) Date of Patent: May 9, 2017

(54) METHODS AND ARRANGEMENTS IN A WIRELESS COMMUNICATION SYSTEM

(71) Applicants: Jinhua Liu, Beijing (CN); Muhammad Kazmi, Bromma (SE); Qingyu Miao, Beijing (CN)

(72) Inventors: Jinhua Liu, Beijing (CN); Muhammad Kazmi, Bromma (SE); Qingyu Miao, Beijing (CN)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 0 days.

(21) Appl. No.: 14/992,527

(22) Filed: Jan. 11, 2016

(65) Prior Publication Data

US 2016/0119048 A1    Apr. 28, 2016

Related U.S. Application Data

(63) Continuation of application No. 14/007,967, filed as application No. PCT/CN2011/000540 on Mar. 30, 2011, now Pat. No. 9,236,924.

(51) Int. Cl.
*H04B 7/06* (2006.01)
*H04W 28/18* (2009.01)
(Continued)

(52) U.S. Cl.
CPC ......... *H04B 7/0619* (2013.01); *H04B 7/0617* (2013.01); *H04B 7/0671* (2013.01);
(Continued)

(58) Field of Classification Search
None
See application file for complete search history.

(56) References Cited

U.S. PATENT DOCUMENTS

| | | | | | |
|---|---|---|---|---|---|
| 5,974,057 | A | * | 10/1999 | Rozanski, Jr. | ....... H04B 17/364 370/519 |
| 2005/0054365 | A1 | * | 3/2005 | Ahn | ...................... H04W 52/58 455/522 |

(Continued)

FOREIGN PATENT DOCUMENTS

| | | |
|---|---|---|
| CN | 1272268 A | 11/2000 |
| CN | 101212249 A | 7/2008 |
| WO | WO 2009131521 A1 | 10/2009 |

OTHER PUBLICATIONS

Gunnarson, Frederick, et al. "Dynamical Effects of Time Delays and Time Delay Compensation in Power Controlled DS-CDMA" IEEE Journal, vol. 19 No. 1, Jan. 2001.

(Continued)

*Primary Examiner* — Bunjob Jaroenchonwanit
(74) *Attorney, Agent, or Firm* — Patents on Demand P.A.; Brian K. Buchheit; Scott M. Garrett

(57) ABSTRACT

Method and arrangement in a user equipment for adjusting signals transmitted in uplink to a network node, based on a feedback value received from the network node. The method comprises transmitting a signal, to be received by the network node. Further, the method comprises receiving a feedback signal from the network node, providing feedback on the transmitted signal. In addition, the method comprises obtaining a value of a time delay of the received feedback signal. Furthermore, the method comprises adjusting signals transmitted in the uplink according to the received feedback signal, wherein compensation is made for the obtained time delay value of the received feedback signal.

18 Claims, 8 Drawing Sheets

(51) Int. Cl.
*H04W 56/00* (2009.01)
*H04W 52/06* (2009.01)
*H04W 52/22* (2009.01)
*H04W 52/04* (2009.01)
*H04W 88/02* (2009.01)
*H04W 52/08* (2009.01)
*H04W 52/10* (2009.01)

(52) U.S. Cl.
CPC .......... *H04B 7/0673* (2013.01); *H04W 28/18* (2013.01); *H04W 52/04* (2013.01); *H04W 52/06* (2013.01); *H04W 52/221* (2013.01); *H04W 56/0065* (2013.01); *H04W 52/08* (2013.01); *H04W 52/10* (2013.01); *H04W 88/02* (2013.01)

(56) References Cited

U.S. PATENT DOCUMENTS

| | | | | |
|---|---|---|---|---|
| 2008/0039128 A1* | 2/2008 | Ostman | ............... | H04W 52/362 455/522 |
| 2009/0034461 A1* | 2/2009 | Pelletier | ............ | H04L 25/03343 370/329 |
| 2010/0074343 A1* | 3/2010 | Gaal | ..................... | H04L 27/261 375/259 |
| 2010/0113054 A1* | 5/2010 | Iwamura | ............... | H04L 1/0026 455/452.1 |
| 2011/0081940 A1* | 4/2011 | Gerstenberger | ...... | H04L 5/0053 455/522 |
| 2011/0199990 A1* | 8/2011 | Chang | ................... | H04W 52/54 370/329 |
| 2011/0205963 A1* | 8/2011 | Tang | .................... | H04B 7/0452 370/328 |
| 2011/0243100 A1* | 10/2011 | Ball | ..................... | H04B 7/0689 370/335 |
| 2011/0286371 A1* | 11/2011 | Yellin | .................. | H04B 7/0617 370/281 |
| 2011/0319121 A1* | 12/2011 | Jen | .......................... | H04L 5/001 455/522 |
| 2012/0093139 A1* | 4/2012 | Hooli | .................... | H04L 1/0618 370/337 |
| 2012/0182968 A1* | 7/2012 | Chin | .................... | H04W 52/40 370/331 |
| 2013/0095869 A1* | 4/2013 | Christoffersso | ...... | H04B 7/0608 455/501 |

OTHER PUBLICATIONS

Ericsson, "Path Delay Measurement". TSG-RAN Working Group 1 Meeting #7, Hannover, Germany, Aug. 30-Sep. 3, 1999.

Huawei, "Concept of UL Closed Loop Transmit Diversity". 3GPP TSG-RAN WG1 Meeting #61, Montreal, Canada, May 10-14, 2010.

3rd Generation Partnership Project; Technical Specification Group Radio Access Network; Physical Layer; Measurements (FDD) (Release 9); 3GPP TS 25.215 V9.2.0 (Mar. 2010).

3rd Generation Partnership Project; Technical Specification Group Radio Access Network; Universal Terrestrial Radio Access (UTRA); Uplink Transmit Diversity for Her High Speed Packet Access (HSPA) (Release 10); 3GPP TR 25.863 V10.0.0 (Jul. 2010).

* cited by examiner

METHODS AND ARRANGEMENTS IN A WIRELESS COMMUNICATION SYSTEM

PRIORITY

This application is a continuation application of U.S. non-provisional application Ser. No. 14/007,967, filed 16 Oct. 2013, which in turn is the U.S. national phase of international application no. PCT/CN2011/000540, filed 30 Mar. 2011. The disclosures of all the applications are incorporated herein by reference in their entirety.

TECHNICAL FIELD

The present disclosure relates to a method and arrangement in a user equipment and to a method and arrangement in a network node. In particular, it relates to adjustment of signals transmitted in uplink to the network node, based on a feedback value received from the network node.

BACKGROUND

User equipment (UE), also known as mobile stations, wireless terminals and/or mobile terminals are enabled to communicate wirelessly in a wireless communication system, sometimes also referred to as a cellular radio system. The communication may be made e.g. between two user equipment units, between a user equipment and a regular telephone and/or between a user equipment and a server via a Radio Access Network (RAN) and possibly one or more core networks.

The user equipment units may further be referred to as mobile telephones, cellular telephones, laptops with wireless capability. The user equipment units in the present context may be, for example, portable, pocket-storable, hand-held, computer-comprised, or vehicle-mounted mobile devices, enabled to communicate voice and/or data, via the radio access network, with another entity, such as another user equipment or a server.

The wireless communication system covers a geographical area which is divided into cell areas, with each cell area being served by a network node, or base station e.g. a Radio Base Station (RBS), which in some networks may be referred to as "eNB", "eNodeB", "NodeB" or "B node", depending on the technology and terminology used. The network nodes may be of different classes such as e.g. macro eNodeB, home eNodeB or pico base station, based on transmission power and thereby also cell size. A cell is the geographical area where radio coverage is provided by the network node/base station at a base station site. One base station, situated on the base station site, may serve one or several cells. The network nodes communicate over the air interface operating on radio frequencies with the user equipment units within range of the respective network node.

In some radio access networks, several network nodes may be connected, e.g. by landlines or microwave, to a Radio Network Controller (RNC) e.g. in Universal Mobile Telecommunications System (UMTS). The RNC, also sometimes termed a Base Station Controller (BSC) e.g. in GSM, may supervise and coordinate various activities of the plural network nodes connected thereto. GSM is an abbreviation for Global System for Mobile Communications (originally: Groupe Spécial Mobile).

In 3rd Generation Partnership Project (3GPP) Long Term Evolution (LTE), network nodes, or base stations, which may be referred to as eNodeBs or even eNBs, may be connected to a gateway e.g. a radio access gateway. The radio network controllers may be connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units. The 3GPP has undertaken to evolve further the UTRAN and GSM based radio access network technologies.

The 3GPP is responsible for the standardization of UMTS and LTE. LTE is a technology for realizing high-speed packet-based communication that may reach high data rates both in the downlink and in the uplink, and is thought of as a next generation mobile communication system relative UMTS.

In the present context, the expression downlink is used for the transmission path from the network node to the user equipment. The expression uplink is used for the transmission path in the opposite direction i.e. from the user equipment to the network node.

Currently, within the 3GPP, the potential benefits of uplink transmit diversity in the context of High-Speed Uplink Packet Access (HSUPA) is evaluated. With uplink transmit diversity, user equipment that are equipped with two or more transmit antennas are capable of utilizing some or all of them. In the initial phase of standardization of the Uplink Transmit Diversity (ULTD), only Open Loop Transmit Diversity (OLTD) is considered. In OLTD the user equipment autonomously decides the antenna weights. The user equipment selects the precoding vector with the assistance of the existing feedback from the network node, such as uplink Transmit Power Control (TPC) commands, Hybrid Automatic Repeat Request (HARQ) feedback, etc. In WCDMA the uplink TPC commands are sent on the downlink by the Node B via Dedicated Physical Control Channel (DPCCH) or Fractional Dedicated Physical Control Channel (F-DPCH) to control the uplink transmit power of the user equipment. The HARQ feedback information contains information such as ACK/NACK bits. The ACK/NACK is sent by Node B in response to the received data packet from the user equipment. In WCDMA the data packets are sent using Enhanced Uplink (EUL) mechanism via uplink data channel called as Enhanced Dedicated Channel (E-DCH). In WCDMA the ACK/NACK information is sent to the user equipment by the Node B via downlink control channel called as Enhanced HARQ Indication Channel (E-HICH). OLTD includes Open Loop Antenna Switching (OLAS) and Open Loop Beam Forming (OLBF). For WCDMA, the OLTD has been studied. The user equipment does the transmit adaptation of the at least two transmit antennas based on the available existing information. The OLTD according to the uplink TPC statistics is more of interest compared to other metrics such as HARQ feedback due to small delay, high frequency, and good availability.

The functionality of OLAS for WCDMA-High Speed Packet Access (HSPA) will now be explained. There may be at least two transmission antennas and at least one full-power power amplifier comprised in a user equipment capable of OLAS for HSPA. The user equipment may select the transmission antenna, among the at least two available transmission antennas, according to TPC statistics, e.g. following the algorithm:

Action A

Let TPC command DOWN be represented by −1 and TPC command UP by +1. Then let the user equipment accumulate all received TPC commands.

Action B

At each frame border the accumulated TPC sum is compared with 0. If the sum is larger than 0 the transmit antenna is switched.

Action C

If the same transmit antenna has been used for x consecutive frames the user equipment automatically switches antenna. x may be referred as the forced switch circle and determined according to the radio environments.

Action D

Every time an antenna switch occurs the accumulated TPC sum is reset to 0.

When performing OLBF, the situation is somewhat different. The user equipment comprises at least two transmit antennas and e.g. two power amplifiers in the user equipment capable of OLBF for HSPA. With e.g. the herein described algorithm, the user equipment may adjust the beam by adjusting the phase bias between two transmit antennas based on the received TPCs:

1. The phase offset, $\delta$, may be set to e.g. 48 degrees, while $\epsilon$ may be set to e.g. 12 degrees.
2. Let TPC command DOWN be represented by −1 and TPC command UP by +1.
   a. Initial relative phase between two transmitters $\Delta\phi = -\delta/2$ for the first slot (#1 slot). $\epsilon$ may be set to zero until two TPC commands become available to the user equipment.
   b. Apply relative phase for the next slot $\Delta\phi = \Delta\phi + \delta$
   c. Determine new relative phase:
      1. if TPC1>TPC2, $\Delta\phi = \Delta\phi + \epsilon$
      2. if TPC2>TPC1, $\Delta\phi = \Delta\phi - \epsilon$
      3. otherwise, no change
      Note that TPC1 and TPC2 correspond to slot (1,2), (3,4), ..., (i*2−1, i*2), where i=1 to n.
   d. Apply relative phase for the next slot $\Delta\phi = \Delta\phi - \delta$
   e. Go to step b.

The measurement of propagation delay (PD) within a network may be calculated:

$$PD = (RTT - UE_{Rx-Tx})/2 \qquad \text{Equation 1}$$

Where PD is the propagation delay; $UE_{Rx-Tx}$ is the time difference between receiving and transmitting at the user equipment while RTT is the Round Trip Time, which is measured by the UTRAN (i.e. by the network node/Node B). Thus the $UE_{Rx-Tx}$ may be defined as the difference in time between the user equipment uplink Dedicated Physical Control Channel (DPCCH) frame transmission and the first detected path (in time), of the downlink Dedicated Physical Channel (DPCH) or Fractional-DPCH (F-DPCH) frame from the measured radio link. There are two defined methods to measure the $UE_{Rx-Tx}$ time difference: Type 1 and Type 2.

For Type 1, the reference reception path may be the first detected path (in time) amongst the paths (from the measured radio link) used in the demodulation process.

For Type 2, the reference reception path may be the first detected path (in time) amongst all paths (from the measured radio link) detected by the user equipment. The reference path used for the measurement may therefore be different for Type 1 and Type 2. The reference point for the $UE_{Rx-Tx}$ time difference may be the antenna connector of the user equipment. Measurement may be made for each cell included in the active set.

The Round Trip Time (RTT) may be defined as:

$$RTT = T_{RX} - T_{TX} \qquad \text{Equation 2}$$

where $T_{TX}$ is the time of transmission of the beginning of a downlink DPCH or F-DPCH frame to the user equipment and the reference point for $T_{TX}$ may be the transmission antenna connector; $T_{RX}$ is the time of reception of the beginning (the first detected path, in time) of the corresponding uplink DPCCH frame from the user equipment and the reference point for $T_{RX}$ may be the reception antenna connector.

In addition the Physical Random Access Channel (PRACH) propagation delay which is measured by the network node/Node B may also be specified as a separate measurement in WCDMA/HSPA. The measurement enables the network node/Node B to measure one way propagation delay between the user equipment and the network node/Node B during the PRACH transmission by the user equipment.

The TPC delay comprises the signal processing delay in the network node, D-NB, the propagation delay in the air interface D-P and the signal processing delay in the user equipment, D-UE:

D-NB may be defined as the time between the start of receiving the uplink DPCCH slot and the time the uplink TPC is generated and prepared for downlink transmission. D-NB is thus known to the network node.

D-P is the propagation delay which depends on the distance from the user equipment to the network node. D-P may be estimated by the network node by applying Equation 1 and/or Equation 2.

D-UE may be defined as the time between the start of the receiving of the downlink slot which carries the uplink TPC and the time the uplink TPC is decoded. D-UE is known to the user equipment.

$$TPC\ delay = D\text{-}NB + D\text{-}P + F\text{-}UE \qquad \text{Equation 3}$$

The TPC delay may comprise 2 to several slots depending on the mentioned delay components above. For instance, the TPC delay may increase several slots dependent on the type of uplink receivers.

Concerning the previously discussed OLAS scheme, the user equipment selects antenna based on the received uplink TPC commands in the period when the antenna is used. FIG. 1A shows the timing relationship between the time when the antenna is being used and the time when the generated TPCs based on the uplink DPCCH quality during this period is received at the user equipment. The decision to continue using antenna 1 is taken based on the TPC command received in period T1 and the decision to continue using antenna 2 is taken based on the TPC command received in period T2. As seen when studying FIG. 1A, the decision made based on the TPC command received in the periods T1 and T2 respectively, due to the TPC time delay, may be erroneous, as the decision may be based on transmissions in fact made by the other antenna.

FIG. 1B illustrates the corresponding situation of interaction between TPC delay and OLBF. By comparing the received TPC commands corresponding to the two opposite beam directions, the user equipment determines which direction is correct for beam adjustment and the uplink precoding vector is determined accordingly. FIG. 1B shows the timing of TPC commands for channel sounding. However, a mismatch due to the TPC delay may be critical for finding the correct beam direction.

The problem e.g. in the scenarios discussed in conjunction with OLAS in FIG. 1A and/or OLBF in FIG. 1B is that the user equipment does not know the TPC delay. This may degrade the performance of OLTD and the system performance in uplink.

For OLAS, the ignorance of TPC delay may have following consequence. All the uplink TPC commands received by the user equipment during its time window of statistics may not be generated by the network node, based on the uplink DPCCH quality when the same transmit antenna is used by the user equipment. This decreases the reliability of selecting the antenna based on the uplink TPC statistics. This means the probability to select the poor antenna is increased.

For OLBF, the ignorance of TPC delay may result in that the user equipment may compare the wrong TPC commands during channel sounding phase. This means that the uplink beam may be generated in the wrong directions and consequently the uplink performance of the user equipment is seriously degraded. This also degrades the uplink received signal quality at the network nodes/base stations which receive the misdirected beam.

The high error probability of antenna selection for OLAS or precoding vector selection for OLBF degrades the perceived uplink quality for the user equipment, which in turn also increases uplink power consumption of the user equipment. Furthermore this also causes large variation of the uplink load/interference/Rise-over-Thermal (RoT) in the system and even overall increase in the uplink load/interference/RoT.

SUMMARY

It is therefore an object to obviate at least some of the above mentioned disadvantages and to improve the performance in a wireless communication system.

According to a first aspect, the object is achieved by a method in a user equipment. The method aims at adjusting signals transmitted in uplink to a network node, based on a feedback value received from the network node. The method comprises transmitting a signal, to be received by the network node. Also, the method comprises receiving a feedback signal from the network node, providing feedback on the transmitted signal. In addition, the method further comprises obtaining a value of a time delay of the received feedback signal. Further, in addition, the method also comprises adjusting signals transmitted in the uplink according to the received feedback signal, wherein compensation is made for the obtained time delay value of the received feedback signal.

According to a second aspect, the object is achieved by an arrangement in a user equipment. The user equipment arrangement aims at adjusting signals transmitted in the uplink to a network node, based on a feedback value received from the network node. The arrangement comprises a transmitter, configured to transmit a signal, to be received by the network node. Further the arrangement comprises a receiver, configured to receive a feedback signal from the network node, which feedback signal provides feedback on the transmitted signal. Additionally, the arrangement comprises a processing circuit, configured to obtain a value of a time delay of the received feedback signal, and to adjust signals transmitted in the uplink according to the received feedback signal, wherein compensation is made for the obtained time delay value of the received feedback signal.

According to a third aspect, the object is achieved by a method in a network node. The method aims at providing a value of a time delay of a feedback signal transmitted to a user equipment for enabling adjustment of signals transmitted in the uplink by the user equipment, based on a feedback value provided by the network node. The method comprises determining that the user equipment is to adjust signals transmitted in the uplink, based on the value of the time delay of the feedback signal. Further, the method comprises transmitting a request to be received by the user equipment, triggering the user equipment to determine the time delay value of the feedback signal.

According to a fourth aspect, the object is achieved by an arrangement in a network node. The user equipment arrangement aims at providing a value of a time delay of a feedback signal transmitted to a user equipment, for enabling adjustment of signals transmitted in the uplink by the user equipment, based on a feedback value provided by the network node. The arrangement comprises a processing circuit, configured to determine that the user equipment is to adjust signals transmitted in the uplink, based on the value of the time delay of the feedback signal. Also, the arrangement comprises a transmitter, configured to transmit a request to be received by the user equipment, triggering the user equipment to determine the time delay value of the feedback signal.

Thanks to embodiments of the present methods and arrangements, the general system stability and performance may be improved, in particular when OLTD is introduced. Further, the user experience may be improved. By compensating the signals transmitted in the uplink, for the time delay of a received feedback signal, it is possible to map the received feedback signal with a previously transmitted uplink signal and/or parameters used for uplink transmission when the uplink signal, on which the feedback relates, was transmitted. Thereby it is possible to base a decision concerning which uplink transmission parameters to use, on the relevant feedback, and for example neglect feedback signals providing feedback on uplink signals transmitted with uplink transmission parameters no longer utilized. This is an advantage, in particular in large cells.

As a result, uplink signals may be adjusted based on relevant feedback signalling, even when the user equipment is situated at the cell border of large cells, and/or when the serving network node suffers from processing delay, due to heavy load. Thus an improved performance within the wireless communication system is achieved.

Other objects, advantages and novel features will become apparent from the following detailed description of the present method and user equipment.

BRIEF DESCRIPTION OF THE DRAWINGS

The methods and arrangements are described in more detail with reference to attached drawings illustrating exemplary embodiments in which.

DETAILED DESCRIPTION

Embodiments herein are defined as a method and arrangement in a user equipment, and as a method and arrangement in a network node, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. It is further to be understood that the drawings are not necessarily drawn to scale and that, unless otherwise indicated, they are merely intended to conceptually illustrate the structures and procedures described herein.

Figure 1A:
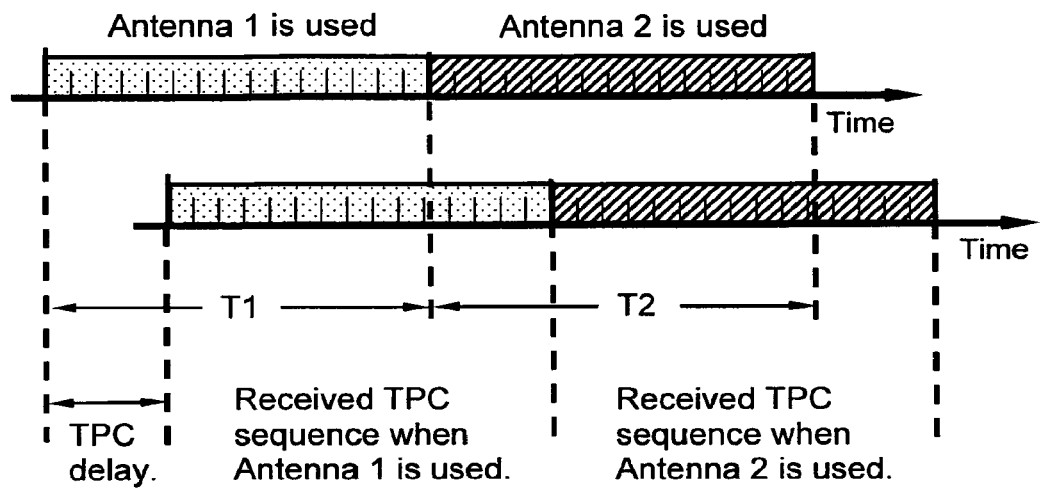
FIG. 1A is a schematic block diagram illustrating a method for adjusting uplink signalling according to prior art.
Figure 1B:
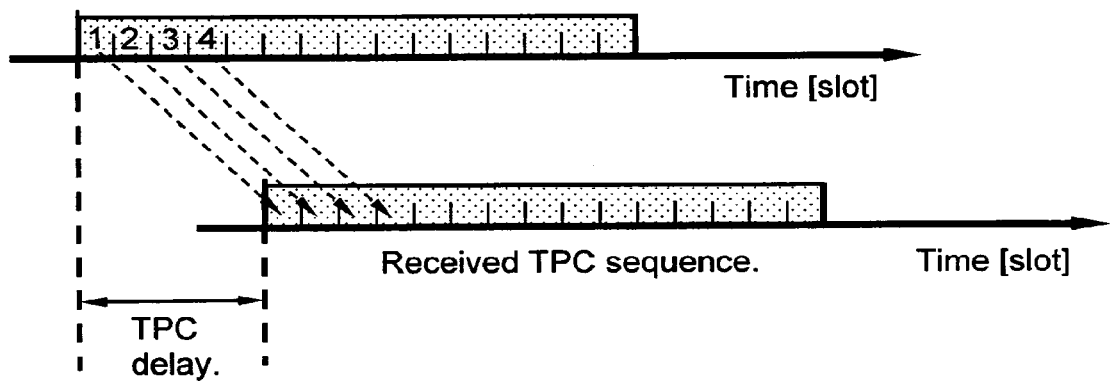
FIG. 1B is a schematic block diagram illustrating a method for adjusting uplink signalling according to prior art.
Figure 2:
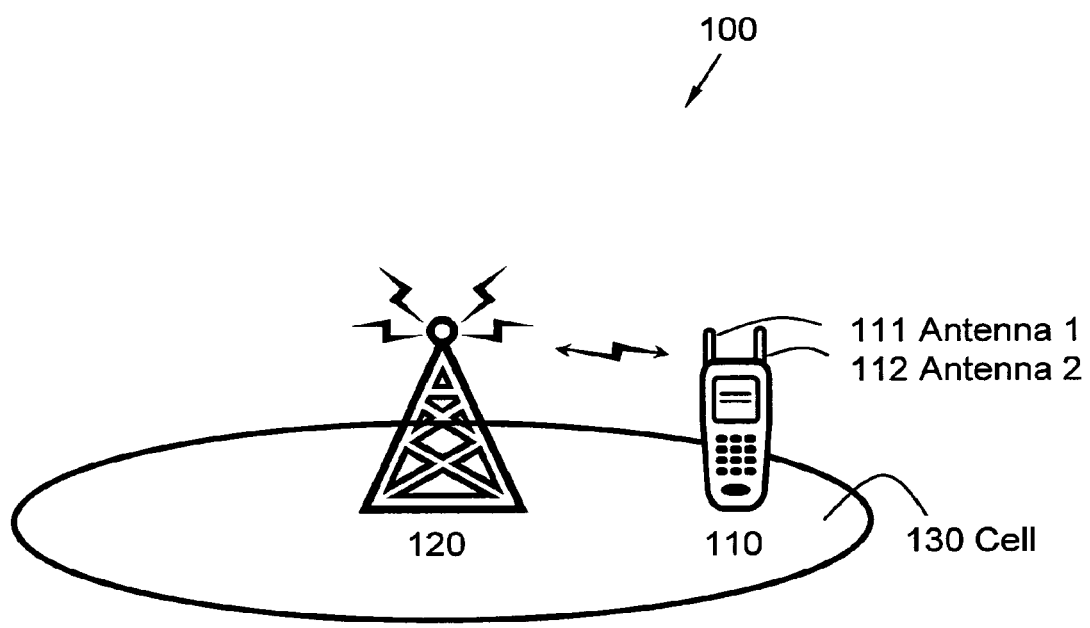
FIG. 2 is a schematic block diagram illustrating an exemplary communication system according to some embodiments.

FIG. 2 depicts a wireless communication system 100. The wireless communication system 100 may at least partly be based on radio access technologies such as e.g. 3GPP LTE, LTE-Advanced, Evolved Universal Terrestrial Radio Access Network (E-UTRAN), UMTS, GSM/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1×RTT and High Rate Packet Data (HRPD), just to mention some few options.

The wireless communication system 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a guard period situated in the time domain between the uplink and downlink signalling. FDD means that the transmitter and receiver operate at different carrier frequencies.

The purpose of the illustration in FIG. 2 is to provide a simplified, general overview of the present method and the functionalities involved. The present methods and arrangements will herein, as a non-limiting example, be described in a 3GPP/WCDMA environment.

The wireless communication system 100 comprises at least one network node 120, and at least one user equipment 110, arranged to communicate with each other. The user equipment 110 is situated in a cell 130, defined by the network node 120. The user equipment 110 is configured to transmit radio signals comprising information to be received by the network node 120. Contrariwise, the user equipment 110 is configured to receive radio signals comprising information transmitted by the network node 120.

It is to be noted that the illustrated network setting of network node 120 and user equipment 110 in FIG. 2 is to be regarded as a non-limiting exemplary embodiment only. The wireless communication network 100 may comprise any other number and/or combination of network nodes 120 and or user equipment units 110, although only one instance of a network node 120 and user equipment 110, respectively are illustrated in FIG. 2 for clarity reasons. A plurality of network nodes 120 and/or user equipment units 110 may further be involved in the present methods according to some embodiments.

Thus whenever "one" or "a/an" network node 120 and/or user equipment 110 is referred to in the present context, a plurality of network node 120 and/or user equipment units 110 may be involved, according to some embodiments.

The network node 120 may be referred to as e.g. base station, NodeB, evolved Node B (eNB, or eNode B), base transceiver station, Access Point Base Station, base station router, Radio Base Station (RBS), macro base station, micro base station, pico base station, femto base station, Home eNodeB, relay and/or repeater, sensor, beacon device or any other network node configured for communication with the user equipment 110 over a wireless interface, depending e.g. of the radio access technology and terminology used. In the rest of the disclosure, the term "network node" will be used for the network node 120, in order to facilitate the comprehension of the present methods.

The user equipment 110 may be represented by e.g. a wireless communication terminal, a mobile cellular phone, a Personal Digital Assistant (PDA), a wireless platform, a mobile station, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the network node 120. The user equipment 110 may according to some embodiments comprise a first antenna 111 and a second antenna 112.

The network node 120 controls the radio resource management within the cell 130, such as e.g. allocating radio resources to the user equipment units 110 within the cell 130 and ensuring reliable wireless communication links between the network node 120 and the user equipment 110. The network node 120 may comprise a Node B in conjunction with a Radio Network Controller (RNC), e.g. in a WCDMA environment, according to some embodiments.

The Radio Network Controller may be a governing element in a WCDMA wireless communication network 100, responsible for control of the Node B, which may be connected to the Radio Network Controller. The Radio Network Controller may carry out radio resource management and some of the mobility management functions, to mention some examples.

Embodiments of the present methods and arrangements provides a method of determination of the feedback delay value either by the user equipment 110 or by the network node 120, e.g. such as a Node B in HSPA.

Further, embodiments of the present method in the user equipment 110 of applying or using only the relevant uplink TPC commands for selecting or determining one or more uplink time delay related parameters e.g. antenna selection, phase etc, wherein the relevant uplink TPC command is the one received by the user equipment 110 within the feedback delay, such as the TPC delay, from the beginning of the uplink DPCCH transmission.

Embodiments of the methods to measure the accurate uplink feedback delay value, such as e.g. the TPC delay, and the related signalling may improve the reliability and uplink stability of the OLAS and OLBF which relay on the uplink TPC commands.

Thus the feedback delay, such as e.g. the TPC delay or the HARQ acknowledgement/non-acknowledgement; or RTT may be determined. The feedback delay measurement may be performed e.g. by applying a certain power pattern, such as e.g. a Dedicated Physical Control CHannel (DPCCH) power pattern according to some embodiments. According to such embodiments, a certain DPCCH power pattern may be generated according to a predetermined sequence with good orthogonality, and a certain correlation between the received the expected TPC sequence and the consequently received TPC sequence, to get the TPC delay value.

Some embodiments of the present methods may provide a transparent solution, i.e. a solution not known to wireless communication system 100. The user equipment 110 may measure and determine the feedback delay, such as e.g. the TPC delay with a certain DPCCH power pattern without asking for the permission of the wireless communication system 100 according to some embodiments.

However, according to some embodiments of the present method a non-transparent solution may be provided, i.e. controlled by wireless communication system 100. The network node 120 may trigger the user equipment 110 to measure the feedback delay, such as e.g. the TPC delay by transmitting signals in the uplink with a pre-defined transmit power pattern.

Further, according to some embodiments of the present method may the feedback delay, such as e.g. the TPC delay and/or RTT be determined by the network node 120 and be provided to the user equipment 110. Thus, according to some embodiments, the network node 120 may measure the feedback delay, such as e.g. the TPC delay and notify the feedback delay, such as e.g. the TPC delay to the user equipment 110 by Radio Resource Control (RRC) signalling or by a High Speed Shared Control CHannel (HS-SCCH) order, or any other suitable channel, etc.

Regardless of the method used for determining the feedback delay value, according to different embodiments of the present methods and arrangements, the user equipment 110 may use the feedback delay value in appropriate selection of the uplink time delay parameters e.g. for antenna selection in OLAS or beam direction/phase difference adjustment in case of OLBF.

Figure 3:
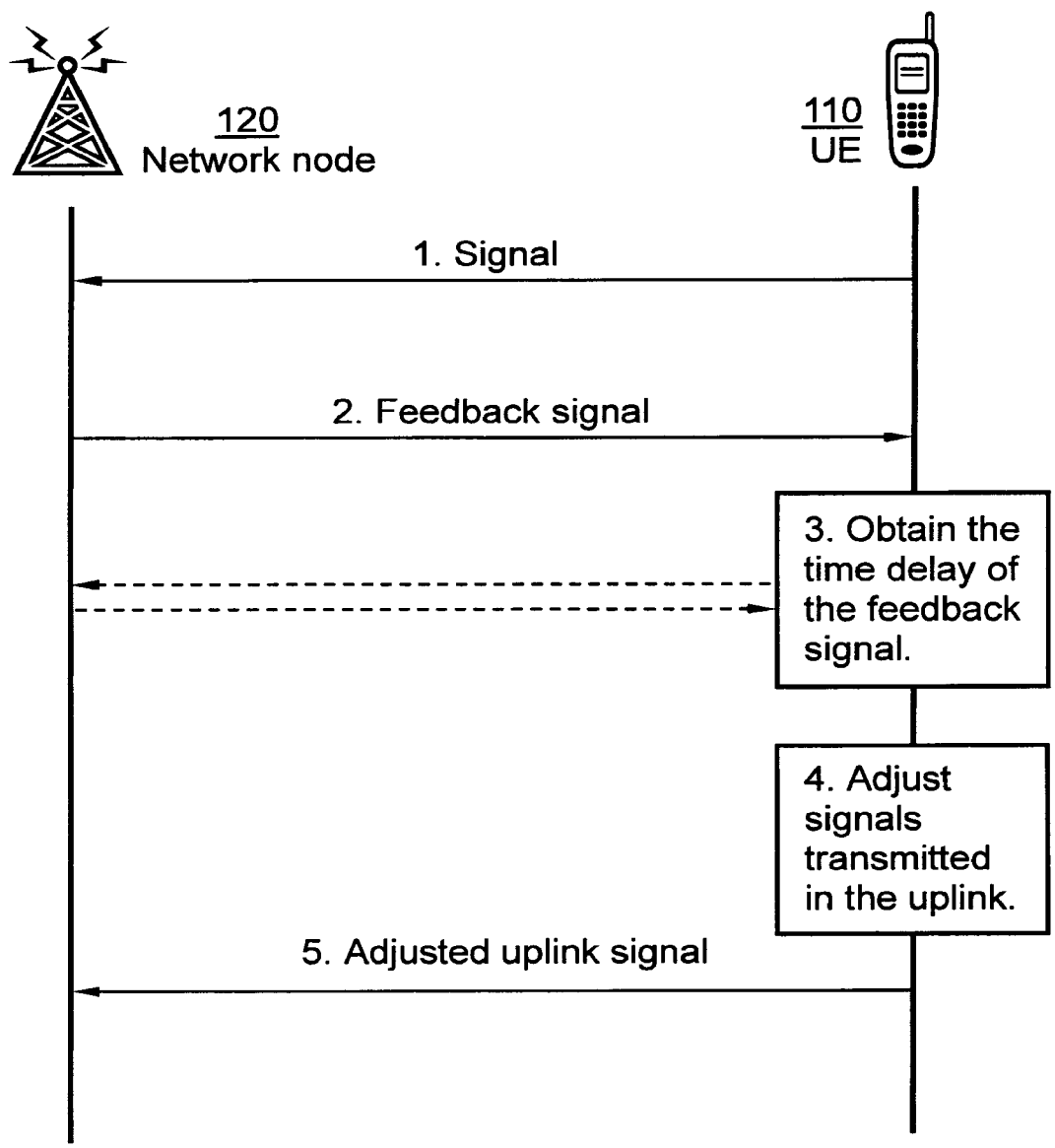
FIG. 3 is a combined flow chart and block diagram illustrating an exemplary embodiment of the present methods.

FIG. 3 is a combined block diagram and flow chart illustrating an embodiment within the wireless communication system 100. The present methods and arrangements aims at determining a feedback delay value and compensate signals transmitted in the uplink with the determined feedback delay value.

The method may comprise a number of actions 1-5, in order to efficiently determine the feedback delay value and compensate signals transmitted in the uplink with the determined feedback delay value in the wireless communication system 100. The actions 1-5 may be performed in a somewhat different order than the herein utilised order of appearance, which is merely exemplary according to different embodiments. Also, further actions may be performed within some embodiments.

Action 1

The user equipment 110 transmits an uplink signal to be received by the network node 120.

Action 2

When the network node 120 receives the signal from the user equipment 110, the network node 120 generates a feedback signal, providing feedback on the received signal. The feedback signal may comprise e.g. a TPC command, or a HARQ ack/nack, to mention some illustrative and non-limiting examples.

Action 3

When the user equipment 110 receives the feedback signal, it may obtain a value of a time delay of the received feedback signal. The time delay may either be measured by the user equipment 110 according to some embodiments, measured by the network node 120 and provided to the user equipment 110. Alternatively, the network node 120 may measure some components of the time delay value, provide these components of the time delay value to the user equipment 110 while the user equipment 110 may measure some other component of the time delay value and calculate the time delay value to be utilized for adjusting the uplink transmission, according to different embodiments.

It will now be given some examples of how the time delay value may be obtained according to some embodiments. Firstly will some arbitrary examples of obtaining the time delay value of the feedback signal at the user equipment 110 be given. Thereafter will some embodiments where the time delay value, or a component thereof, such as e.g. the round trip time, is determined at the network node 120 and provided to the user equipment 110 be further explained and discussed.

User equipment based determination of the time delay value

User equipment based feedback delay determination will now be discussed. According to some embodiments, the method may enable the user equipment 110 to measure the feedback delay, such as e.g. TPC delay, by utilizing certain DPCCH transmit power pattern. The method may be transparent or non-transparent to the network node 120, as described and exemplified herein.

Determine a sequence A with good orthogonality, such as e.g. a maximum-length sequence (m-sequence):

$$A=(a_1,a_2,\ldots,a_N)$$

where N is the length of the sequence A.

Let $a_i$ ($i=1\sim N$) be 1 or $-1$

The sequence A may be predetermined and stored in a memory accessible from the user equipment 110 according to some embodiments. The sequence A may alternatively according to some embodiments be predetermined and stored at the network node 120 and provided to the user equipment 110.

Let TPC command DOWN be represented by $-1$ and TPC command UP by $+1$. A DPCCH transmit power pattern may be designed to generate a TPC command sequence which may be expected to be the same as, or correspond to, the sequence A.

$$\text{P-DPCCH}=(p_1,p_2,\ldots,p_N)$$

where P-DPCCH denotes the DPCCH power pattern that is generated according to the selected sequence A. The DPCCH power $p_i$ is corresponding to the element $a_i$ of the sequence A. The DPCCH power may be set clearly higher/lower than the required DPCCH power when $a_i$ is $1/-1$.

Then the DPCCH power pattern is transmitted in the uplink and the received TPCs are stored within a certain time window.

$$\text{TPC\_set}=(\text{TPC}_1,\text{TPC}_2,\ldots,\text{TPC}_Q)$$

Where TPC_set denotes the received TPC sequence and Q (Q>N) is the number of the stored TPC commands received in the above mentioned time window. Thus: $\text{TPC}_1$ is the received TPC command (1/−1), when the DPCCH transmit power pattern sequence A is transmitted with power $p_1$, etc.

Q may be selected to be larger than N, i.e. the length of the sequence A, according to some embodiments, so that the TPC delay may be expected to be within:

$$0 \sim (Q-N)$$

The TPC delay value may then be determined using correlation between the selected sequence A and the received TPC sequence TPC_set:

$$C = (c_0, c_1, \ldots, c_{Q-N})$$

Where:

$$c_j = \sum_{k=1}^{N} (a_k \cdot TPC_{j+k}),$$

and

Then the TPC delay value, may be determined as the index of the maximum element of the correlation sequence C. However, there are different ways to measure the TPC delay by the TPC pattern according to different embodiments.

The TPC delay measurement may be either in idle slots, i.e. only when DPCCH is transmitted, no Enhanced Dedicated Channel (E-DCH) data; or in busy slots, i.e. when both DPCCH and E-DCH are transmitted simultaneously.

When the DPCCH power pattern is transmitted simultaneously with E-DCH, the E-DCH power offset may be compensated according to the DPCCH power change in order to ensure the E-DCH quality, according to some embodiments.

The TPC delay measurement may be done either in consecutive slots or non-consecutive slots. The non-consecutive slots may be situated sufficiently apart in time e.g. each element of the sequence may be transmitted every 5th slot, according to some embodiments.

The measurement of the time delay value at the user equipment 110 may be made transparently or non-transparently according to different embodiments, as briefly mentioned above. Some exemplifying embodiments will now be described.

Transparent method means, in the present context, that the user equipment 110 does the TPC delay measurement by using e.g. the previously described principle or method embodiment, without notifying the network node 120. A sequence may be predetermined by the user equipment 110, i.e. it may be user equipment implementation specific. By using the predetermined sequence the user equipment 110 may measure the TPC delay when OLAS or OLBF is activated or periodically during OLAS or OLBF is activated.

TPC delay between the user equipment 110 and the network node 120 may change due to various factors e.g. user mobility, processing delay in the network node 120 etc. For example the user mobility may increase the propagation delay, which in turn may increase the TPC delay. The processing delay in the network node 120 may depend upon the number of active user equipment 110 within the cell 130, number of associated procedures currently handled by the network node 120 etc. Furthermore after a handover, the new/target network node 120 may have different processing capability and/or load than the old/source network node. After the handover, the propagation delay may also change, especially if the cell range of the new cell is different from that of the old serving cell. Hence the user equipment 110 may also measure the TPC delay periodically, e.g. every 2 seconds, or from time to time, or after the handover due to the above reasons according to some embodiments. The periodicity or frequency with which the TPC delay is measured may also depend upon factors such as user speed and/or cell range. For example at higher speed the TPC delay may be measured more often since the rate of change of propagation delay increases with the speed. Similarly for large cell range the TPC delay may also with certain advantage be measured more often especially at higher speed since the propagation delay in a large cell varies substantially depending upon the location of the user equipment 110 in the cell. The cell range may be as large as 200 km in open areas such as desert, steppes, tundra etc.

The user equipment 110 may not be able to fully follow the power control algorithm when sending the DPCCH transmit power pattern i.e. during the transmission of the sequence it may increase its transmit power even though the uplink TPC command is 'down'. Thus, according to some embodiments no transmission power adjustment may be made at the user equipment 110 due to any TPC commands received from the network node 120 during a period when the user equipment 110 is obtaining the time delay value of the received feedback signal. The uplink power control requirements are required to be met with 90% confidence interval under steady state. Generally the statistics to verify the power control requirements may be collected over several seconds. But typically the DPCCH transmit pattern comprises just a few, or a limited number of time slots e.g. 4-10 time slots, to mention a non-limiting example.

This means that the user equipment 110 which determines the TPC delay value using the herein described embodiments still may pass the existing power control or related requirements. In particular when the user equipment 110 uses scattered, i.e. not consecutive, time slots to measure the TPC delay, the power control requirements may be met with the target confidence interval e.g. 90% of the time. In case the power pattern based on the consecutive slots, the user equipment 110 may use fewer time slots to ensure that the power control or the related requirements are met. The power pattern sequence may also be pre-determined i.e. it may be a standardized power pattern sequence.

Non-transparent method means, in the present context, that the user equipment 110 does the TPC delay measurement by using e.g. the previously described principle or method embodiment, only under the control and supervision of the network node 120. In embodiments of the present methods and arrangements performed in a WCDMA related environment, the network node 120 may comprise a Node B or RNC or even a relay, which may each individually, or together in conjunction perform such control and supervision.

Thus the main difference between the transparent method and the non-transparent method is that in the non-transparent method, the user equipment 110 may determine the TPC delay value upon receiving a request from the network node 120. Hence the user equipment 110 according to such embodiments may not perform the TPC delay measurement for determining the TPC delay until explicitly requested or permitted by the network node 120.

Further, according to different embodiments, the previously discussed power pattern sequence A may be e.g. a fully or partly pre-determined sequence, according to different embodiments.

Thus, according to some embodiments, a certain sequence may be predefined. This means the pre-determined sequence may be stored for example in the memory of the user equipment 110. The network node 120, such as e.g. a Node B may trigger or activate the TPC delay measurement by sending an indicator, indicating for the user equipment 110 whether to perform the TPC measurement or not. The indicator may be sent to the user equipment 110 by the network node 120 in a suitable control channel e.g. using lower layer signalling such as the High-Speed Shared Control Channel (HS-SCCH) order in HS-SCCH, in Access Grant Channel (A-GCH), in Media Access Control (MAC) Packet Data Unit (PDU) or MAC header, or together with the OLTD activation order, according to different embodiments.

Alternatively, the network node 120, or even the RNC comprised or in conjunction with the network node 120 according to some embodiments, may activate the TPC measurement by using higher layer signalling such as Radio Resource Control (RRC). Moreover, the network node 120 may also use broadcast channel or system information to activate the TPC delay measurement in the user equipment 110.

Upon receiving the request or trigger from the network node 120, the user equipment 110 may use the stored, predetermined sequence to perform the TPC delay measurement, e.g. according to any of the herein described method algorithms. The user equipment 110 may also be required to complete the TPC delay measurement within a predefined duration. The network node 120 may also indicate the time instance, or the activated time when the user equipment 110 may start the TPC delay measurement i.e. the time when the user equipment 110 may start the transmission of the pre-determined sequence. More than one sequence may also be pre-determined, according to some embodiments. Each pre-determined sequence may be identified or addressed e.g. by a pre-determined identifier. In this case, the network node 120 may also inform the user equipment 110 about the sequence to be used i.e. the network node 120 may send the pre-determined identifier of the pre-determined sequence/s to the user equipment 110. The identifier may be sent by using lower layer signalling or higher layer signalling as mentioned above i.e. HS-SCCH, RRC etc.

However, according to some embodiments, the sequence may be partly pre-determined. In these embodiments, the sequence may not be fully defined. For example the minimum and maximum power levels to be used in the sequence may be predetermined. But the actual sequence and the size, i.e. number of slots, may not be pre-defined according to such embodiments. Hence the network node 120 may signal the remaining details of the sequence to be used by the user equipment 110 for performing the TPC delay measurement. This may be performed in the form of a bitmap such as e.g. 11110000, where 1 and 0 represent the pre-determined maximum and minimum power levels. The network node 120 may send this information via lower or higher layer signalling, according to some embodiments.

Alternatively, the network node 120 may also use combination of the higher layer and lower layer signalling to enable user equipment 110 to perform the TPC delay measurement, according to some embodiments. For example, the network node 120, or e.g. the RNC may pre-configure the user equipment 110 with a suitable sequence using higher layer signalling such as e.g. RRC. However the lower layer signalling e.g. by sending HS-SCCH order by the network node 120, it may activate the actual TPC measurement. The TPC measurement may be activated at a suitable time e.g. initial setup or after handover or prior to using or activating certain feature such as ULTD etc.

The TPC delay measurements may be based on a pre-determined rule, according to some embodiments. The network node 120 may activate the TPC delay measurement in the user equipment 110 conditionally. For instance, the network node 120 may activate the TPC delay measurement in the user equipment 110, for example in one of the following cases: when the OLTD mode, such as OLAS or OLBF, is to be activated for the user equipment 110; when the signal processing delay for TPC generation in the network node 120 is to be changed; when the active time of the user equipment 110 in OLTD mode is longer than a predetermined threshold time; when the best uplink cell 130 of the user equipment 110 in OLTD mode is changed, just to mention some arbitrary examples.

However, the TPC delay measurement, or a component of the TPC delay measurement such as the RTT may, according to some embodiments be performed in the network node 120 and signalled to the user equipment 110.

According to some embodiments, the propagation delay D-P may be measured by the network node 120, e.g. according to the previously described method algorithms. The network node 120 such as e.g. Node B or any other relevant network node may also use any other suitable method to determine the propagation delay.

The signal processing delay D-NB is known to the network node 120. The network node 120 may send the D-P+D-NB to the user equipment 110.

In one embodiment, the network node 120 e.g. Node B, may use the HS-SCCH order or other methods/channels such as MAC PDU or MAC header or any other L1/L2 signalling to send the measured TPC delay to the user equipment 110.

According to yet other embodiments, another network node such as e.g. RNC may send the measured TPC delay to the user equipment 110, e.g. via RRC signalling. The TPC delay may be measured in the network node 120 e.g. in Node B. Hence these embodiments require that the TPC delay measured by the network node 120, e.g. Node B, is first signalled to the other network node, e.g. by Node B to RNC over Iub interface.

With the knowledge of processing delay in the user equipment 110, the user equipment 110 may then obtain the TPC delay according to the previously described Equation 3.

The network node 120 may activate the TPC delay measurement similarly as mentioned above and send the delay D-P+D-NB to the user equipment 110, for example when D-P+D-NB is changed, according to some embodiments. Thereby, the user equipment 110 may determine the feedback delay value, or TPC delay value, by determining or computing the D-UE which, as already is described, may be defined as the time between the start of the receiving of the downlink slot which carries the uplink TPC and the time the uplink TPC is decoded. D-UE is known to the user equipment.

The TPC delay value may then be computed by the user equipment 110, by adding the components, i.e. TPC delay=D-NB+D-P+D-UE.

Action 4

The signals transmitted in the uplink may then be adjusted according to the received feedback signal, wherein compensation is made for the obtained time delay value of the received feedback signal.

The disclosed feedback delay measurement methods described herein may be utilised in various ways. The method for use of feedback delay in OLTD is merely one aspect or application of the present methods and arrangements. The feedback delay such as e.g. the TPC delay, may also be used for other application. For instance, the feedback delay information may also be used in the feedback delay compensation in inner loop power control, according to some embodiments. The feedback delay information may also be used for network planning, optimization and hardware dimensioning with the aim of improving the overall power control performance, according to some embodiments.

Action 5

Thereafter, an adjusted uplink signal, or sequence of signals, may be transmitted to the network node 120, according to some embodiments.

Embodiments of the present methods and arrangements may be implemented mainly within a WCDMA/HSPA wireless communication system 100. However the present methods and arrangements may be applicable to any other technology in which two or more uplink transmission antennas 111, 112 may be used in the user equipment 110 and the uplink power control may be in operation. The uplink power control operation requires that the transmit power of the user equipment 110 may partially or fully be controlled by the uplink TPC commands which are sent by the network node 120.

Figure 4A:
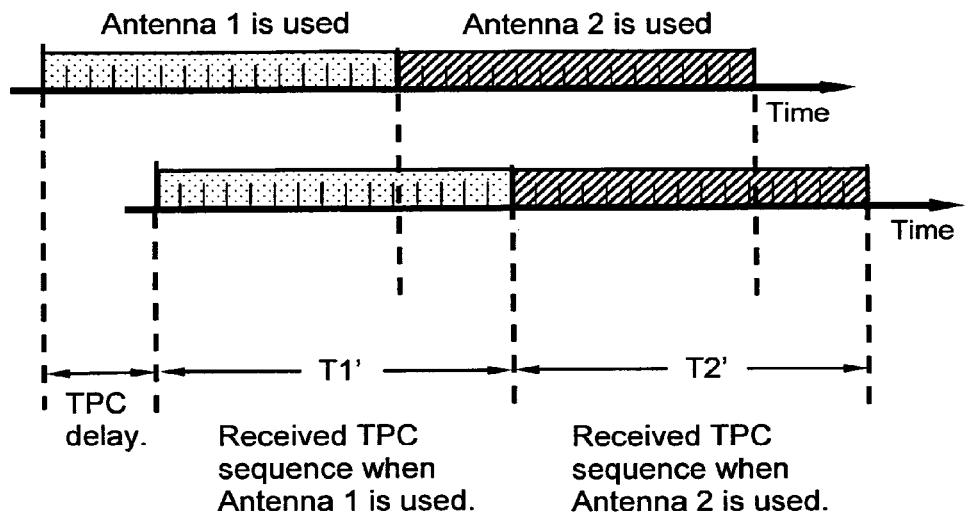
FIG. 4A is a schematic block diagram illustrating a method for adjusting uplink signalling according to some embodiments.

The measured feedback delay value may then be applied to improve the OLTD performance, such as OLAS or OLBF, as illustrated in FIG. 4A. The antenna switch error for OLAS and the precoding vector selection error for OLBF due to the unknown TPC delay may thereby be eliminated, minimized or at least reduced.

For OLAS, the accuracy and reliability of statistics of uplink TPC commands may be improved. In each period of antenna switching, the correct time window for TPC statistics may be identified by the user equipment 110 after the precise TPC delay value is determined for the user equipment 110 by any of the described method embodiments. The accumulated TPC delay value may be calculated based on the uplink TPC commands received in the identified time window. Then antenna switching is determined according to the accumulated TPC delay value. For instance in FIG. 4A, the time window T1'/T2' may be identified after TPC delay value is known by the user equipment 110 in the 1st/2nd antenna switching period.

Figure 4B:
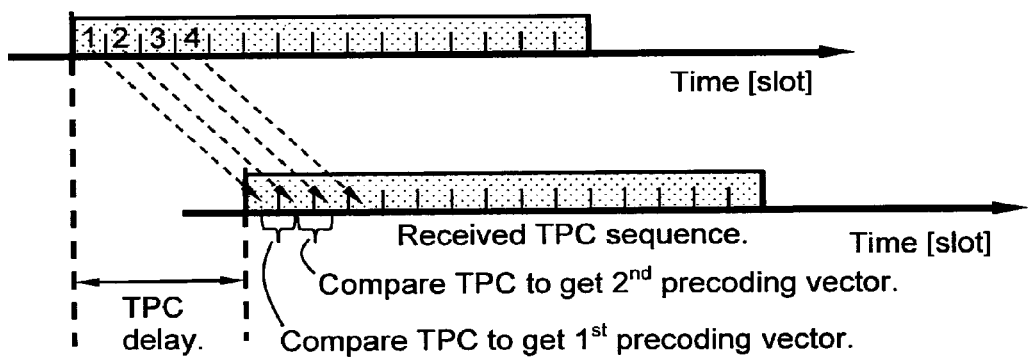
FIG. 4B is a schematic block diagram illustrating a method for adjusting uplink signalling according to some embodiments.

FIG. 4B illustrates an OLBF scheme, wherein the user equipment 110 knows the accurate TPC delay. In each period of channel sounding, the two TPC commands corresponding to the channel sounding in two opposite directions may be identified after the precise TPC delay value is obtained, i.e. determined by the user equipment 110. Further, the user equipment 110 may determine the correct uplink precoding vector based on the identified TPC commands received from the network node 120.

Furthermore the present embodiments may also apply to multi-carrier system or the so-called Carrier Aggregation (CA) system i.e. in which the user equipment 110 receive and/or transmit data/control using more or more carriers simultaneously. In HSPA, the examples of multi-carrier systems may comprise DC-HSDPA, DC-HSUPA, DB-DC-HSDPA, 4C-HSDPA, 8C-HSDPA, MC-HSPA etc.

The present embodiments may also apply to Multi-Standard Radio (MSR) in that either of the user equipment 110, or the network node 120, or both may be based on MSR principle. A MSR node such as e.g. MSR base station may comprise common Radio Frequency (RF) components, e.g. common power amplifiers, RF filters etc, which may be used to operate more than one Radio Access Technology (RAT) or more than one carrier within the same RAT. More specifically the MSR base station may also be termed as Multi-Carrier Multi-Standard Radio (MC-MSR) base station due to the fact that it may comprise a single RAT with more than one carrier. The carriers within the MSR node may be adjacent or non-adjacent.

The user equipment 110 may use the OLTD and select the relevant/appropriate OLTD parameters based on the TPC delay measurement according to some embodiments as described in the preceding section.

The network node 120 may send the uplink TPC commands to the user equipment 110, which uses the received uplink TPC commands for determining the appropriate OLTD parameters.

The network node 120 may comprise or be in conjunction with a RNC. The network node 120, or the RNC, may activate and/or configure the TPC measurement at the user equipment 110 by using higher layer signalling such as e.g. RRC.

Examples of the user equipment 110 for which embodiments of the present methods or arrangements applies, but is not limited to, are user equipment 110, The present methods and arrangements may be applicable to the backhaul link of the relay, which has two or more antennas 111, 112 and utilizes the OLTD technique. The relay node may be in-band or out-band. In in-band relay the backhaul link and the access link operate using the same carrier frequency. In out band relay the backhaul link and the access link operate using different carrier frequencies. The relay may be a single hop or multi-hop. In the latter case the present methods and arrangements may be applicable to each backhaul link.

The TPC delay information may also be used in the TPC delay compensation in inner loop power control. Due to the TPC delay, not all the transmitted uplink TPC commands are applied on the uplink DPCCH. The not applied uplink TPC commands in the new TPC generation may be disregarded, so that uplink DPCCH power may be controlled more precisely. Concerning the TPC delay information, it may be an advantage in order to know which TPC commands are not to be applied. The accurate TPC delay information may improve the performance of such TPC delay compensation algorithm.

Thanks to embodiments of the present methods and arrangements, the general system stability and performance may be improved when OLTD is introduced. Further, the user experience may be improved.

Figure 5:
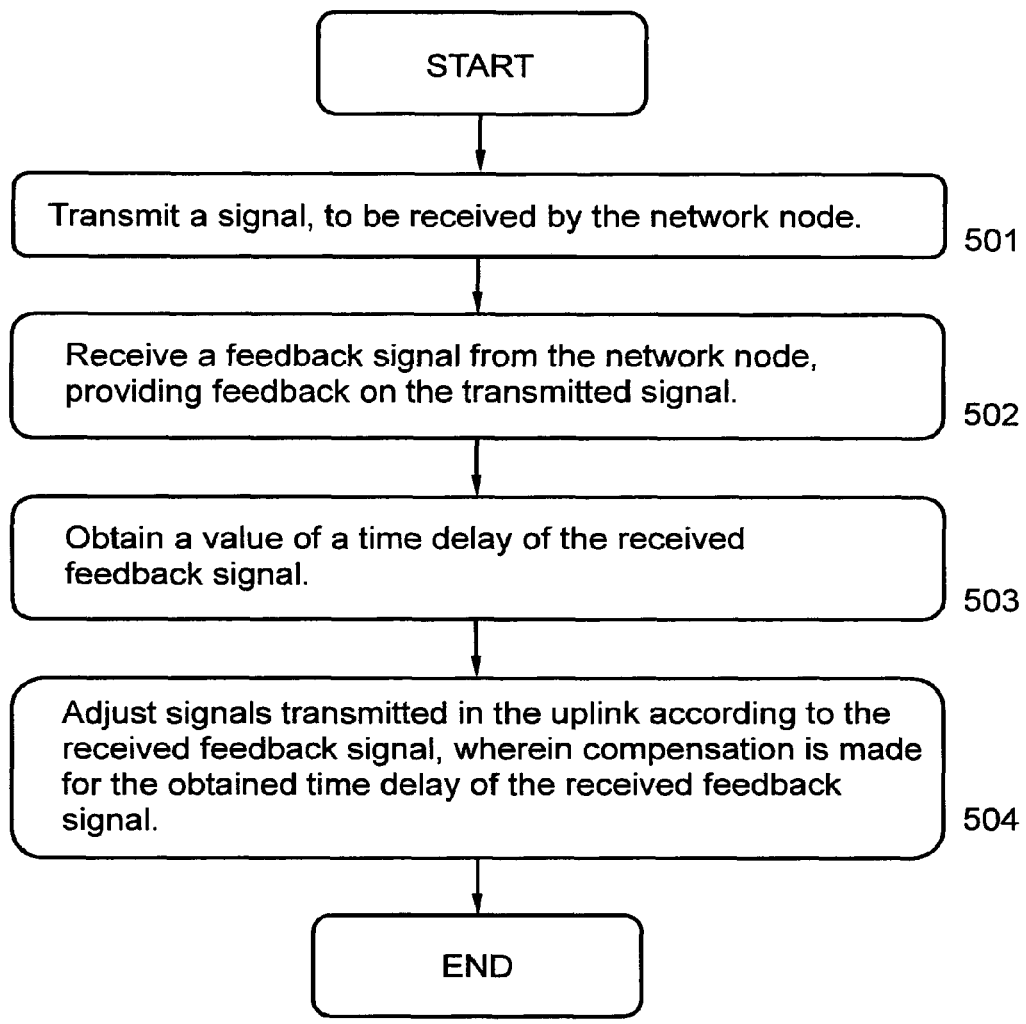
FIG. 5 is a schematic block diagram illustrating an exemplary embodiment of a method in a user equipment.

FIG. 5 is a flow chart illustrating embodiments of a method in a user equipment 110. The method aims at adjusting signals transmitted in uplink to a network node 120, based on a feedback value received from the network node 120. The user equipment 110 and the network node 120 may be comprised in a wireless communication system 100. The wireless communication system 100 may be based on e.g. WCDMA, wherein the network node 120 may comprise a Node B, in conjunction with a Radio Network Controller, and wherein the uplink transmission may take place on any of: Dedicated Physical Control Channel, or enhanced Dedicated Physical Control Channel, according to some embodiments. However, the wireless communication system 100 may alternatively be based on the Long-Term Evolution project within the Third Generation Partnership Project according to some embodiments, wherein the network node 120 may comprise an Evolved Node B, and wherein the uplink transmission may take place on a Physical Uplink Control Channel.

The user equipment 110 may comprise, according to some embodiments, at least two transmission antennas 111, 112 whereby one transmission antenna 111 of the at least two transmission antennas 111, 112 may alternately be used for uplink transmission while the other transmission antenna 112 of the at least two transmission antennas 111, 112 may not be used for uplink transmission at the same time. Further, the user equipment 110 may be configured for uplink transmit diversity by Open Loop Antenna Switching, according to some embodiments. However, the user equipment 110 may comprise at least two transmission antennas 111, 112, wherein uplink transmission is performed on the at least two transmission antennas 111, 112, transmitting the same signal simultaneously by adjusting a phase difference between the signals transmitted by the at least two antennas 111, 112, such that a beam of the transmitted signal is created in certain direction. The user equipment 110 may be configured for uplink transmit diversity by Open Loop Beam Forming according to some embodiments.

To appropriately adjust signals transmitted in uplink to the network node 120, the method may comprise a number of actions 501-504.

It is however to be noted that some of the described actions, e.g. action 501-504 may be performed in a somewhat different chronological order than the enumeration indicates Further, any, some or all actions, such as e.g. 503 and 504 may be performed simultaneously or in a rearranged chronological order. The method may comprise the following actions:

Action 501

A signal is transmitted, to be received by the network node 120. Thus an uplink signal is transmitted from the user equipment 110, to be received by the network node 120.

Action 502

A feedback signal is received from the network node 120, which feedback signal provides feedback on the previously transmitted 501 signal.

The feedback signal may be received/transmitted/communicated/transceived on any of: Dedicated Physical Control Channel, Fractional Dedicated Physical Channel, High Speed Shared Control Channel or Enhanced Dedicated Channel Absolute Grant Channel, according to some embodiments. However, the feedback signal may be transmitted on Physical Downlink Control Channel according to some embodiments.

Action 503

A value of a time delay of the received 502 feedback signal, i.e. a time delay value, is obtained.

The time delay value of the received feedback signal may be the difference in time between the moment when the user equipment 110 transmits 501 the uplink signal and the moment when the user equipment 110 receives 502 the feedback signal from the network node 120, according to some embodiments.

To obtain, i.e. to determine the value of the time delay of the received 502 feedback signal may comprise: transmitting a signal in the uplink at a transmission power level associated with a feedback reference value, receiving a feedback value from the network node 120, providing feedback on the transmitted uplink signal, comparing the feedback reference value with the received feedback value, and if the feedback reference value corresponds to the received feedback value, determining the value of a time delay of the received 502 feedback signal to be the difference in time between the transmission of the uplink signal and the reception of the feedback value, according to some embodiments.

However, to obtain i.e. to determine the value of the time delay of the received 502 feedback signal may comprise, according to some embodiments: transmitting a sequence of uplink signals over a control channel at different transmission power levels $P=(p_1, p_2, \ldots, p_N)$ associated with a Transmit Power Control reference sequence $TPC\_ref=(r_1, r_2, \ldots, r_N)$, receiving, from the network node 120, a sequence of Transmit Power Control commands $TPC\_set=(TPC_1, TPC_2, \ldots, TPC_Q)$ such that $Q>N$, triggered by the transmitted sequence of uplink signals, calculating a correlation sequence $C=(c_0, c_1, \ldots, c_{Q-N})$ between TPC_ref and TPC_set such that $$c_j = \sum_{k=1}^{N} (a_k \cdot TPC_{j+k}),$$

and determining the value of the time delay of the received 502 feedback signal to be the index of the largest element of the correlation sequence.

It may be noted that no transmission power adjustment may be made, according to some embodiments, at the user equipment 110 due to any Transmit Power Control commands received from the network node 120 during a period when the user equipment 110 is obtaining 503, i.e. determining the time delay value of the received 502 feedback signal.

The user equipment 110 may according to some embodiments be triggered to obtain, i.e. to determine, the value of the time delay of the received 502 feedback signal by any of: a request received from the network node 120; a handover event; a certain time interval has passed since the time delay value was obtained; periodically, where the period is pre-determined or configured by the network node 120; the user equipment 110 is set into Open Loop Transmit Diversity (OLTD) mode, such as Open Loop Antenna Switching (OLAS) mode or Open Loop Beam Forming (OLBF) mode; signal processing delay for generation of Transmit Power Control (TPC) commands in the network node 120 is to be changed; active time of the user equipment 110 in Open Loop Transmit Diversity (OLTD) mode is longer than a threshold time; a change of best uplink cell of the user equipment 110 in Open Loop Transmit Diversity (OLTD) mode is made; user equipment speed is above a threshold over a time interval; received signal quality in the uplink and/or in the downlink is worse than a threshold over a time interval.

The herein described sequence of uplink signals to be transmitted at different transmission power levels associated with the reference sequence, according to some embodiments, may be pre-determined and may be stored in a memory 625 of the user equipment 110.

However, according to some embodiments, the sequence of uplink signals to be transmitted at different transmission power levels associated with the reference sequence may alternatively be configured by the network node 120.

Furthermore, according to some embodiments, obtaining the value of the time delay of the received 502 feedback signal may comprise receiving at least a component of the value of the time delay of the received 502 feedback signal from the network node 120. The component may comprise e.g. the round trip time, and/or the propagation delay time and/or the delay time within the network node 120. Thus the network node 120, according to some embodiments may measure these values and provide them to the user equipment 110. The user equipment 110 may then obtaining the value of the time delay of the received feedback signal by adding the delay time within the user equipment 110 and add this value to the components of the time delay value received from the network node 120.

However, according to some embodiments, the network node 120 may compute the time delay of the feedback signal and provide that value to the user equipment 110. Thus the user equipment 110 does not have to perform any further computations, according to some embodiments.

The user equipment 110, according to some embodiments, reports the estimated TPC delay to the network node 120. The network node 120 even acquires the statistics of the TPC delay from multiple user equipments. The network node 120 uses the acquired statistics of the TPC delay for network planning and optimization. For example if mean or percentile of the TPC delay is below certain threshold then the network may increase the hardware resources to shorten the processing time. This in turn may reduce the TPC delay. Furthermore the network node 120 may further report the acquired statistics of the TPC delay to another, second network node, which in turn may use the received statistics for network planning and optimization. Examples of second network node are Self Organizing Network (SON), Operational Support Systems (OSS), Operation and Maintenance (O&M), another RNC or any centralized node or controller or any network management node. For example the second network node may recommend the maximum number of user equipment 110 which may be handled in order to limit the processing delay.

Some embodiments may also be applicable when the user equipment 110 is in soft handover.

Further, some embodiments may be applicable when the user equipment 110 transmits in the uplink towards more than one base station e.g. in uplink co-ordinated multipoint transmission and reception (CoMP). In CoMP the user equipment 110 transmits towards and/or receive data from more than one cell 130.

Action 504

Signals transmitted in the uplink are adjusted according to the received feedback signal, wherein compensation is made for the obtained time delay value of the received feedback signal.

According to some embodiments wherein the user equipment 110 comprises at least two antennas 111, 112, configured for Open Loop Antenna Switching, signals transmitted in the uplink may be adjusted by selecting one transmission antenna 111 of the at least two transmission antennas 111, 112 for the uplink transmission, i.e. for transmitting signals in the uplink to be received by the network node 120.

When adjusting the signals transmitted in the uplink according to some embodiments, the obtained 503 time delay value may be used, for determining if the received 502 feedback signal is related to the uplink signal transmitted 501 on the transmission antenna 111 used for uplink transmission. Thus, according to such embodiments, signals transmitted in the uplink may be adjusted by selecting one transmission antenna 111 of the at least two transmission antennas 111, 112 to be used for uplink transmission, based on the received 502 feedback signal related to the transmission antenna 111 used for uplink transmission.

According to some embodiments, wherein the user equipment 110 may be configured for uplink transmit diversity by Open Loop Beam Forming, signals transmitted in the uplink may be adjusted by selecting beam direction or phase difference between the signals transmitted by the at least two transmission antennas 111, 112.

When adjusting the signals transmitted in the uplink according to some embodiments, the obtained 503 time delay value may be used, for determining if the received feedback signal is related to the uplink signal transmitted 501 at the currently used phase difference between the signals transmitted by the at least two transmission antennas 111, 112. Further, signals transmitted in the uplink may be adjusted by selecting beam direction, or phase difference, based on the received 502 feedback signal related to the currently used phase difference between the signals transmitted by the at least two transmission antennas 111, 112.

The signals transmitted in the uplink may alternatively be adjusted, according to some embodiments by adjusting the transmission power of the user equipment 110 according to a Transmit Power Control command, received from the network node 120, with compensation made for the obtained 503 time delay value of the received 502 feedback signal. The feedback signal may comprise a feedback control signal, according to some embodiments. The feedback control signal may comprise a Transmit Power Control (TPC) command according to some embodiments. However, the transmitted signal may be transmitted over an uplink data channel and may comprise data. The feedback control signal may according to such embodiments comprise an acknowledgement/non-acknowledgement of the transmitted uplink data.

Figure 6:
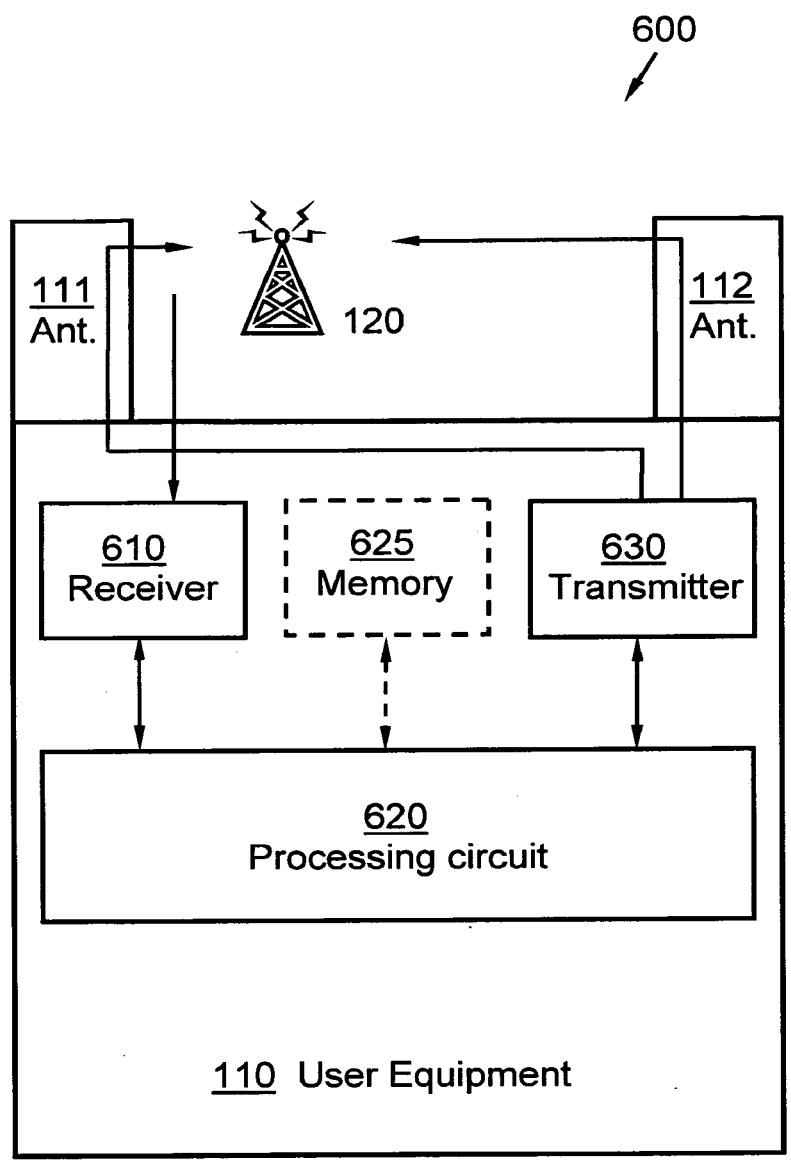
FIG. 6 is a schematic block diagram illustrating an exemplary embodiment of an arrangement in a user equipment.

FIG. 6 is a block diagram illustrating an arrangement 600 within a user equipment 110. The user equipment 110 may be represented by a mobile station or the like, according to some embodiments. The user equipment 110 is configured to perform any, some or all of the previously described actions 501-504 for adjusting signals transmitted in the uplink to a network node 120, based on a feedback value received from the network node 120. The user equipment 110 and the network node 120 may be comprised in a wireless communication system 100, according to some embodiments.

The wireless communication system 100 may be based on e.g. WCDMA, wherein the network node 120 may comprise a Node B, in conjunction with a Radio Network Controller, and wherein the uplink transmission may take place on any of: Dedicated Physical Control Channel, or enhanced Dedicated Physical Control Channel, according to some embodiments. However, the wireless communication system 100 may alternatively be based on the Long-Term Evolution project within the Third Generation Partnership Project according to some embodiments, wherein the network node 120 may comprise an Evolved Node B, and wherein the uplink transmission may take place on a Physical Uplink Control Channel.

The user equipment 110 may comprise, according to some embodiments, at least two transmission antennas 111, 112 whereby one transmission antenna 111 of the at least two transmission antennas 111, 112 may alternately be used for uplink transmission while the other transmission antenna 112 of the at least two transmission antennas 111, 112 may not be used for uplink transmission at the same time. Further, the user equipment 110 may be configured for uplink transmit diversity by Open Loop Antenna Switching, according to some embodiments. However, the user equipment 110 may comprise at least two transmission antennas 111, 112, wherein uplink transmission is performed on the at least two transmission antennas 111, 112, transmitting the same signal simultaneously by adjusting a phase difference between the signals transmitted by the at least two antennas 111, 112, such that a beam of the transmitted signal is created in certain direction. The user equipment 110 may be configured for uplink transmit diversity by Open Loop Beam Forming according to some embodiments.

For the sake of clarity, any internal electronics or other components of the user equipment 110, not completely indispensable for understanding the present method has been omitted from FIG. 6.

In order to perform the actions 501-504 correctly, the user equipment arrangement 600 comprises a transmitter 610. The transmitter 610 is configured to transmit a signal, to be received by the network node 120. Further, the arrangement 600 comprises a receiver 620. The receiver 620 is configured to receive a feedback signal from the network node 120, which signal provides feedback on the transmitted signal. Also, in addition, the arrangement 600 comprises a processing circuit 630. The processing circuit 630 is configured to obtain a value of a time delay of the received feedback signal, and to adjust signals transmitted in the uplink according to the received feedback signal, wherein compensation is made for the obtained time delay value of the received feedback signal.

The processing circuit 620 may in addition also be configured to determine the time delay value of the received 502 feedback signal by measuring and calculating the difference in time between the moment when the user equipment 110 transmits 501 the uplink signal and the moment when the user equipment 110 receives 502 the feedback signal from the network node 120, according to some embodiments.

The processing circuit 620 may comprise e.g. one or more instances of a Central Processing Unit (CPU), a processing unit, a processor, a microprocessor, or other processing logic that may interpret and execute instructions. The processing circuit 620 may further perform data processing functions for inputting, outputting, and processing of data comprising data buffering and device control functions, such as call processing control, user interface control, or the like.

In addition, the user equipment arrangement 600 in addition may comprise a memory 625. The memory 625 may be configured to store a pre-determined sequence of uplink signals to be transmitted at different transmission power levels associated with a reference sequence.

Further, the arrangement 600 may according to some embodiments, further comprise a first transmission antenna 111, and a second transmission antenna 112, which transmission antennas 111, 112 are configured to operate in Open Loop Transmit Diversity mode, such as Open Loop Antenna Switching mode or Open Loop Beam Forming mode.

Further, it is to be noted that some of the described units 610-630 comprised within the user equipment arrangement 600 in the wireless communication system 100 are to be regarded as separate logical entities but not with necessity separate physical entities. To mention just one example, the receiver 610 and the transmitter 630 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the network node 120, and the user equipment 110 may comprise both traffic and control signals e.g. paging signals/messages for incoming calls, which may be used to establish and maintain a voice call communication with another party or to transmit and/or receive data, such as SMS, e-mail or MMS messages, with a remote user equipment, or other node comprised in the wireless communication system 100.

The actions 501-504 to be performed in the user equipment 110 may be implemented through one or more processing circuits 620 in the user equipment 110, together with computer program code for performing the functions of the present actions 501-504. Thus a computer program product, comprising instructions for performing the actions 501-504 in the user equipment 110 may adjust signals transmitted in the uplink to a network node 120, based on a feedback value received from the network node 120, when being loaded into the one or more processing circuits 620.

The computer program product mentioned above may be provided for instance in the form of a data carrier carrying computer program code for performing at least some of the actions 501-504 according to some embodiments when being loaded into the processing circuit 620. The data carrier may comprise e.g. a hard disk, a CD ROM disc, a memory stick, an optical storage device, a magnetic storage device or any other appropriate medium such as a disk or tape that may hold machine readable data. The computer program product may furthermore be provided as computer program code on a server and downloaded to the user equipment 110 remotely, e.g. over an Internet or an intranet connection.

Figure 7:
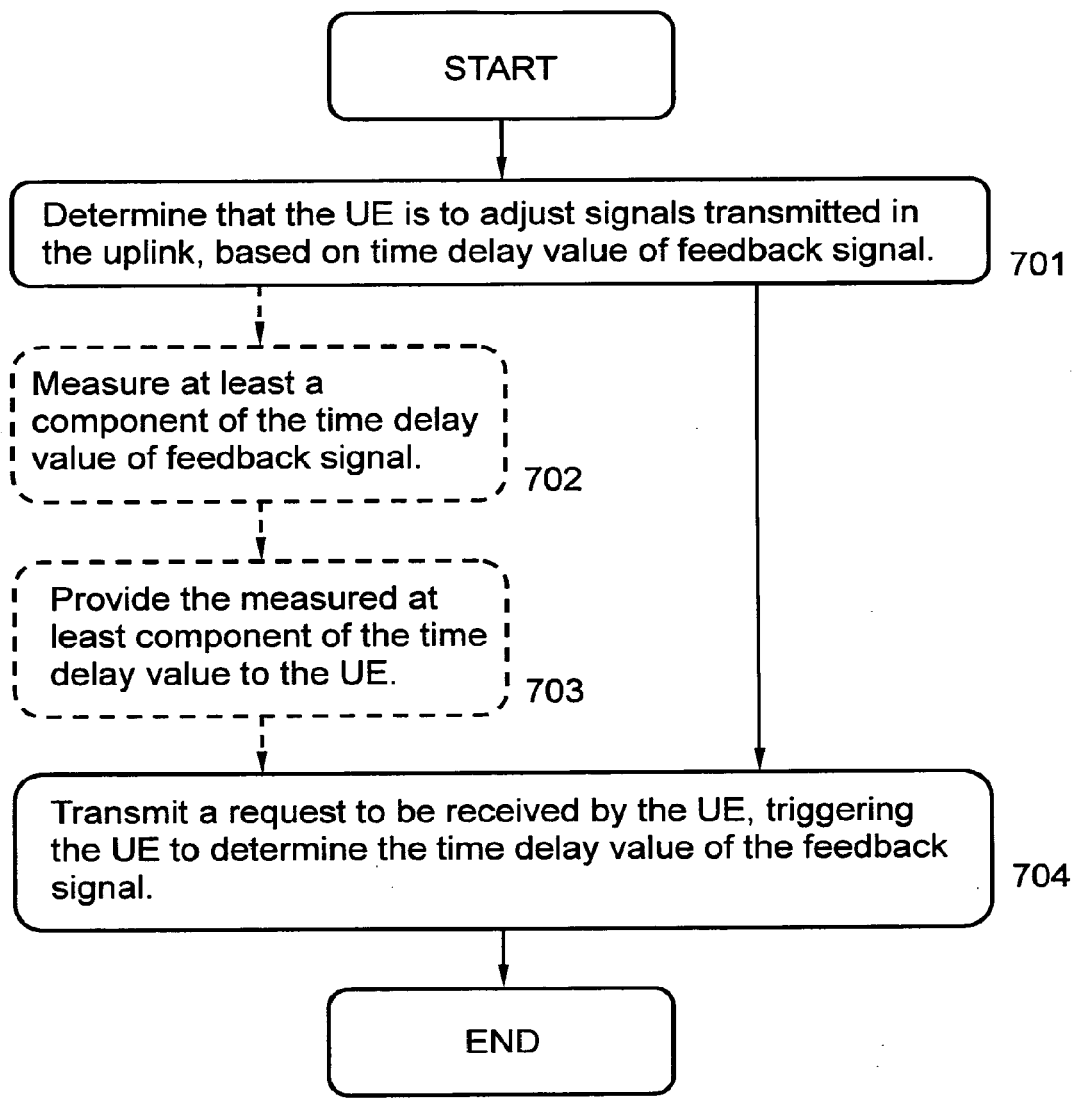
FIG. 7 is a schematic block diagram illustrating an exemplary embodiment of a method in a network node.

FIG. 7 is a flow chart illustrating embodiments of a method in a network node 120. The method aims at providing a value of a time delay of a feedback signal transmitted to a user equipment 110 for enabling adjustment of signals transmitted in the uplink by the user equipment 110, based on a feedback value provided by the network node 120.

The user equipment 110 and the network node 120 may be comprised in a wireless communication system 100. The wireless communication system 100 may be based on e.g. WCDMA, wherein the network node 120 may comprise a Node B, in conjunction with a Radio Network Controller, and wherein the uplink transmission may take place on any of: Dedicated Physical Control Channel, or enhanced Dedicated Physical Control Channel, according to some embodiments. However, the wireless communication system 100 may alternatively be based on the Long-Term Evolution project within the Third Generation Partnership Project according to some embodiments, wherein the network node 120 may comprise an Evolved Node B, and wherein the uplink transmission may take place on a Physical Uplink Control Channel.

The user equipment 110 may comprise, according to some embodiments, at least two transmission antennas 111, 112 whereby one transmission antenna 111 of the at least two transmission antennas 111, 112 may alternately be used for uplink transmission while the other transmission antenna 112 of the at least two transmission antennas 111, 112 may not be used for uplink transmission at the same time. Further, the user equipment 110 may be configured for uplink transmit diversity by Open Loop Antenna Switching, according to some embodiments. However, the user equipment 110 may comprise at least two transmission antennas 111, 112, wherein uplink transmission is performed on the at least two transmission antennas 111, 112, transmitting the same signal simultaneously by adjusting a phase difference between the signals transmitted by the at least two antennas 111, 112, such that a beam of the transmitted signal is created in certain direction. The user equipment 110 may be configured for uplink transmit diversity by Open Loop Beam Forming according to some embodiments.

The feedback signal may comprise a feedback control signal, according to some embodiments. The feedback control signal may comprise a Transmit Power Control (TPC) command according to some embodiments. However, the transmitted signal may be transmitted over an uplink data channel and may comprise data. The feedback control signal may according to such embodiments comprise an acknowledgement/non-acknowledgement of the transmitted uplink data.

To appropriately provide a value of a time delay of a feedback signal transmitted to a user equipment 110, the method may comprise a number of actions 701-704.

It is however to be noted that some of the described actions may be performed in a somewhat different chronological order than the enumeration indicates Further, any, some or all actions, such as e.g. 703 and 704 may be performed simultaneously or in a rearranged chronological order. The method may comprise the following actions:

Action 701

It is determined that the user equipment 110 is to adjust signals transmitted in the uplink, based on the value of the time delay of the feedback signal.

Action 702

This action is performed within some alternative embodiments.

At least a component of the time delay value of the feedback signal transmitted to the user equipment 110 may be measured.

The feedback signal may be transmitted on any of: Dedicated Physical Control Channel, Fractional Dedicated Physical Channel, High Speed Shared Control Channel or Enhanced Dedicated Channel Absolute Grant Channel, according to some embodiments. However, the feedback signal may be transmitted on Physical Downlink Control Channel according to some embodiments.

Action 703

This action is performed within some alternative embodiments.

The measured time delay value of the feedback signal transmitted to the user equipment 110, or a component thereof, may be provided, i.e. transmitted to the user equipment 110.

The time delay value of the received feedback signal may be the difference in time between the moment when the user equipment 110 transmits the uplink signal and the moment when the user equipment 110 receives the feedback signal from the network node 120, according to some embodiments. The component of the time delay value of the feedback signal transmitted to the user equipment 110 may comprise e.g. the round trip time, and/or the propagation delay time and/or the delay time within the network node 120. Thus, the component of the time delay value of the feedback signal transmitted to the user equipment 110 may comprise the time required by the network node 120 to process the generation of the feedback signal, according to some embodiments.

Thus the network node 120, according to some embodiments may measure these values and provide them to the user equipment 110. The user equipment 110 may then obtaining the value of the time delay of the received feedback signal by adding the delay time within the user equipment 110 and add this value to the components of the time delay value received from the network node 120.

However, according to some embodiments, the network node 120 may compute the time delay of the feedback signal and provide that value to the user equipment 110.

Action 704

A request is transmitted, to be received by the user equipment 110, which request triggers the user equipment 110 to determine the time delay value of the feedback signal.

According to some alternative embodiments, the request may comprise the computed feedback delay value, or at least a component thereof, which thus may be provided to the user equipment 110.

Figure 8:
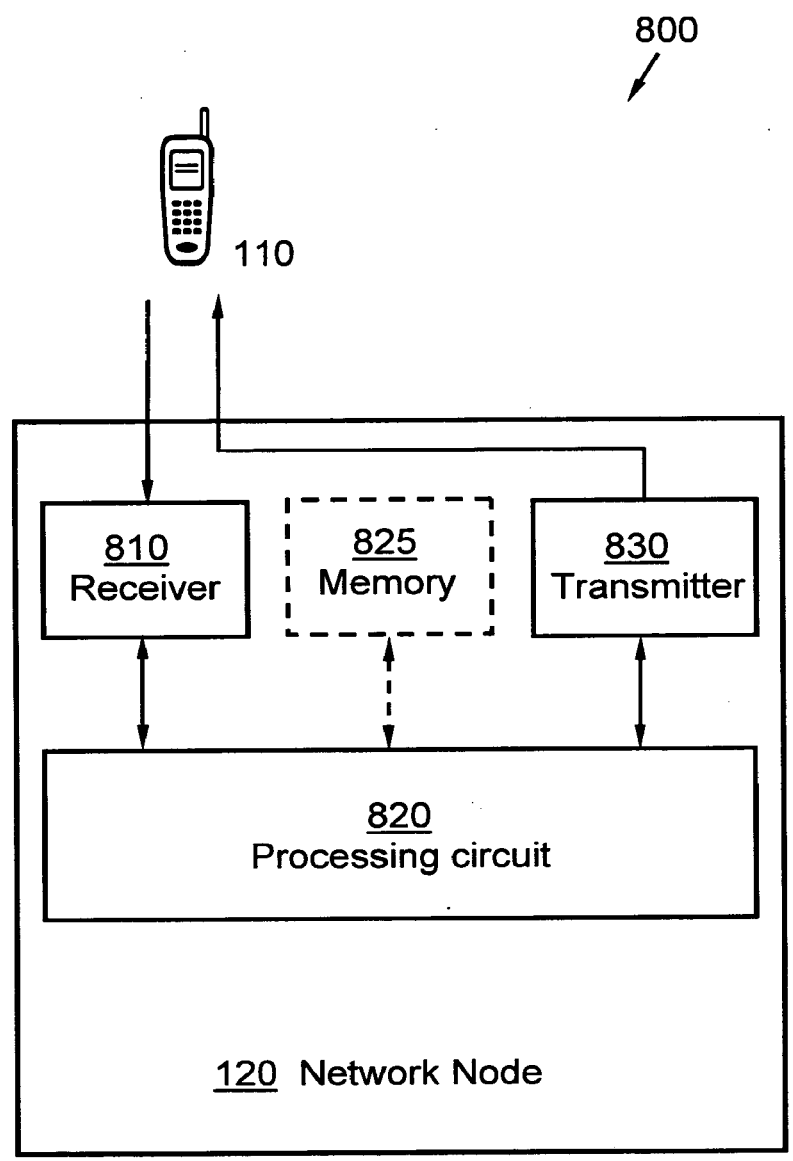
FIG. 8 is a schematic block diagram illustrating an exemplary embodiment of an arrangement in a network node.

FIG. 8 is a block diagram illustrating an arrangement 800 within a network node 120. The network node 120 is configured to perform any, some or all of the previously described actions 701-704 for providing a value of a time delay of a feedback signal transmitted to a user equipment 110 for enabling adjustment of signals transmitted in the uplink by the user equipment 110, based on a feedback value provided by the network node 120.

The user equipment 110 may be represented by a mobile station or the like, according to some embodiments. The user equipment 110 and the network node 120 may be comprised in a wireless communication system 100, according to some embodiments.

The wireless communication system 100 may be based on e.g. WCDMA, wherein the network node 120 may comprise a Node B, in conjunction with a Radio Network Controller, and wherein the uplink transmission may take place on any of: Dedicated Physical Control Channel, or enhanced Dedicated Physical Control Channel, according to some embodiments. However, the wireless communication system 100 may alternatively be based on the Long-Term Evolution project within the Third Generation Partnership Project according to some embodiments, wherein the network node 120 may comprise an Evolved Node B, and wherein the uplink transmission may take place on a Physical Uplink Control Channel.

The user equipment 110 may comprise, according to some embodiments, at least two transmission antennas 111, 112 whereby one transmission antenna 111 of the at least two transmission antennas 111, 112 may alternately be used for uplink transmission while the other transmission antenna 112 of the at least two transmission antennas 111, 112 may not be used for uplink transmission at the same time. Further, the user equipment 110 may be configured for uplink transmit diversity by Open Loop Antenna Switching, according to some embodiments. However, the user equipment 110 may comprise at least two transmission antennas 111, 112, wherein uplink transmission is performed on the at least two transmission antennas 111, 112, transmitting the same signal simultaneously by adjusting a phase difference between the signals transmitted by the at least two antennas 111, 112, such that a beam of the transmitted signal is created in certain direction. The user equipment 110 may be configured for uplink transmit diversity by Open Loop Beam Forming according to some embodiments.

For the sake of clarity, any internal electronics or other components of the network node 120, not completely indispensable for understanding the present method has been omitted from FIG. 8.

In order to perform the actions 701-704 correctly, the network node arrangement 800 comprises a processing circuit 820. The processing circuit 820 is configured to determine that the user equipment 110 is to adjust signals transmitted in the uplink, based on the value of the time delay of the feedback signal. The processing circuit 620 may in addition also be configured to determine the time delay value of the feedback signal by measuring and calculating the difference in time between the moment when the user equipment 110 transmits the uplink signal and the moment when the user equipment 110 receives the feedback signal from the network node 120, according to some embodiments.

The processing circuit 820 may comprise e.g. one or more instances of a Central Processing Unit (CPU), a processing unit, a processor, a microprocessor, or other processing logic that may interpret and execute instructions. The processing circuit 820 may further perform data processing functions for inputting, outputting, and processing of data comprising data buffering and device control functions, such as call processing control, user interface control, or the like.

Further, the arrangement 800 comprises a transmitter 830. The transmitter 830 is configured to transmit a request to be received by the user equipment 110, triggering the user equipment 110 to determine the time delay value of the feedback signal.

Also, in alternative addition, the arrangement 800 may comprise a receiver 810. The receiver 810 may be configured to receive signals e.g. from the user equipment 110, according to some embodiments.

Further, it is to be noted that some of the described units 810-830 comprised within the network node arrangement 800 in the wireless communication system 100 are to be regarded as separate logical entities but not with necessity separate physical entities. To mention just one example, the receiver 810 and the transmitter 830 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the network node 120, and the user equipment 110 may comprise both traffic and control signals e.g. paging signals/messages for incoming calls, which may be used to establish and maintain a voice call communication with another party or to transmit and/or receive data, such as SMS, e-mail or MMS messages, with a remote user equipment, or other node comprised in the wireless communication system 100.

The actions 701-704 to be performed in the network node 120 may be implemented through one or more processing circuits 820 in the network node 120, together with computer program code for performing the functions of the present actions 701-704. Thus a computer program product, comprising instructions for performing the actions 701-704 in the network node 120 may for providing the value of the time delay of the feedback signal transmitted to the user equipment 110 for enabling adjustment of signals transmitted in the uplink by the user equipment 110, based on a feedback value provided by the network node 120, when being loaded into the one or more processing circuits 820.

The computer program product mentioned above may be provided for instance in the form of a data carrier carrying computer program code for performing at least some of the actions 701-704 according to some embodiments when being loaded into the processing circuit 820. The data carrier may comprise e.g. a hard disk, a CD ROM disc, a memory stick, an optical storage device, a magnetic storage device or any other appropriate medium such as a disk or tape that may hold machine readable data. The computer program product may furthermore be provided as computer program code on a server and downloaded to the network node 120 remotely, e.g. over an Internet or an intranet connection.

When using the formulation "comprise" or "comprising" within the present context, it is to be interpreted as non-limiting, i.e. meaning "consist at least of". The present methods and devices are not limited to the above described preferred embodiments. Various alternatives, modifications and equivalents may be used. Therefore, the above embodiments are not to be taken as limiting the scope of claimed protection, which instead is to be defined by the appending claims.

The invention claimed is:

1. A method in a user equipment for adjusting signals transmitted in uplink to a network node, based on a feedback value received from the network node, the method comprising transmitting a signal to the network node,
receiving a feedback signal from the network node, providing feedback on the transmitted signal,
measuring a value of a time delay of the received feedback signal, and
adjusting signals transmitted in the uplink based on the value of the time delay of the feedback signal, wherein compensation is made for the measured time delay value of the received feedback signal.

2. The method according to claim 1, wherein measuring the time delay value of the received feedback signal comprises measuring the difference in time between the moment when the user equipment transmits the uplink signal and the moment when the user equipment receives the feedback signal from the network node.

3. The method according to claim 1, wherein measuring the value of the time delay of the received feedback signal comprises transmitting a signal in the uplink at a transmission power level associated with a feedback reference value,
receiving a feedback value from the network node, providing feedback on the transmitted uplink signal,
comparing the feedback reference value with the received feedback value, and if the feedback reference value corresponds to the received feedback value,
determining the value of a time delay of the received feedback signal to be the difference in time between the transmission of the uplink signal and the reception of the feedback value.

4. The method according to claim 1, wherein measuring the value of the time delay of the received feedback signal comprises transmitting a sequence of uplink signals over a control channel at different transmission power levels $P=(p_1, p_2, \ldots, P_N)$ associated with a Transmit Power Control reference sequence $TPC\_ref=(r_1, r_2, \ldots, r_N)$,
receiving, from the network node, a sequence of Transmit Power Control commands $TPC\_set=(TPC_1, TPC_2, \ldots, TPC_Q)$ such that Q>N, triggered by the transmitted sequence of uplink signals,
calculating a correlation sequence $C=(c_0, c_1, \ldots, C_{Q-N})$ between TPC_ref and TPC_set such that $$c_j = \sum_{k=1}^{N} (a_k \cdot TPC_{j+k}),$$

and
determining the value of the time delay of the received feedback signal to be the index of the largest element of the correlation sequence.

5. The method according to claim 1, further comprising preventing transmission power adjustment at the user equipment due to any Transmit Power Control commands received from the network node during a period when the user equipment is measuring the time delay value of the received feedback signal.

6. The method according to claim 1, wherein the measuring of the value of the time delay of the received feedback signal is triggered by any of: a request received from the network node; a handover event; a certain time interval has passed since the previous time delay value was measured; periodically, where the period is predetermined or configured by the network node; the user equipment is set into Open Loop Transmit Diversity mode, wherein the Open Loop Transmit Diversity mode comprises Open Loop Antenna Switching mode or Open Loop Beam Forming mode; signal processing delay for generation of Transmit Power Control commands in the network node is to be changed; active time of the user equipment in Open Loop Transmit Diversity mode is longer than a threshold time; a change of best uplink cell of the user equipment in Open Loop Transmit Diversity mode is made; user equipment speed is above a threshold over a time interval; received signal quality in the uplink and/or in the downlink is worse than a threshold over a time interval.

7. The method according to claim 4, wherein the transmitting the sequence of uplink signals comprises:
transmitting a pre-determined sequence of uplink signals stored in a memory of the user equipment.

8. The method according to claim 4, wherein the transmitting the sequence of uplink signals comprises:
transmitting the sequence of uplink signals configured by the network node.

9. The method according to claim 1, wherein measuring the value of the time delay of the received feedback signal comprises receiving at least a component of the time delay value of the received feedback signal from the network node.

10. The method according to claim 1, wherein
the user equipment comprises at least two transmission antennas, wherein one transmission antenna of the at least two transmission antennas is alternately used for uplink transmission while the other transmission antenna of the at least two transmission antennas is not used for uplink transmission at the same time, and wherein
the user equipment is configured for uplink transmit diversity by Open Loop Antenna Switching, and wherein
signals transmitted in the uplink are adjusted by selecting one transmission antenna of the at least two transmission antennas for the uplink transmission.

11. The method according to claim 1, wherein
the measured time delay value is used, when adjusting the signals transmitted in the uplink, for determining if the received feedback signal is related to the uplink signal transmitted on the transmission antenna used for uplink transmission, and wherein
signals transmitted in the uplink are adjusted by selecting one transmission antenna of the at least two transmission antennas to be used for uplink transmission, based on the received feedback signal related to the transmission antenna used for uplink transmission.

12. The method according to claim 1, wherein
the user equipment comprises at least two transmission antennas, wherein uplink transmission is performed on the at least two transmission antennas, transmitting the same signal simultaneously by adjusting a phase difference between the signals transmitted by the at least two antennas, such that a beam of the transmitted signal is created in certain direction, and wherein
the user equipment is configured for uplink transmit diversity by Open Loop Beam Forming, and wherein
signals transmitted in the uplink are adjusted by selecting beam direction or phase difference between the signals transmitted by the at least two transmission antennas.

13. The method according to claim 12, wherein
the measured time delay value is used when adjusting signals transmitted in the uplink, for determining if the received feedback signal is related to the uplink signal transmitted at the currently used phase difference between the signals transmitted by the at least two transmission antennas, and wherein
signals transmitted in the uplink are adjusted by selecting beam direction, or phase difference, based on the received feedback signal related to the currently used phase difference between the signals transmitted by the at least two transmission antennas.

14. The method according to claim 1, wherein the signals transmitted in the uplink are adjusted by adjusting the transmission power of the user equipment according to a Transmit Power Control command, received from the network node, with compensation made for the measured time delay value of the received feedback signal.

15. A user equipment for adjusting signals transmitted in the uplink to a network node, based on a feedback value received from the network node, the user equipment comprising
a transmitter, configured to transmit a signal to the network node,
a receiver, configured to receive a feedback signal from the network node, providing feedback on the transmitted signal,
a processing circuit, configured to measure a value of a time delay of the received feedback signal, and to adjust signals transmitted in the uplink based on the value of the time delay of the feedback signal, wherein compensation is made for the measured time delay value of the received feedback signal.

16. The user equipment according to claim 15, further comprising
a memory configured to store a pre-determined sequence of uplink signals to be transmitted at different transmission power levels associated with a reference sequence.

17. The user equipment according to claim 15, further comprising
a first transmission antenna, and a second transmission antenna, which transmission antennas are configured to operate in Open Loop Transmit Diversity mode, wherein the Open Loop Transmit Diversity mode comprises Open Loop Antenna Switching mode or Open Loop Beam Forming mode.

18. A method in a network node for providing a feedback signal transmitted to a user equipment in response to a signal received from the user equipment for enabling adjustment of signals transmitted in the uplink by the user equipment, based on a feedback signal transmitted by the network node to the user equipment, the method comprises
determining that the user equipment is to adjust signals transmitted in the uplink, based on the feedback signal, and
transmitting a request to be received by the user equipment, triggering the user equipment to measure a value of time delay of the feedback signal
measuring at least a component of the time delay value of the feedback signal transmitted to the user equipment, and
providing the measured time delay value of the feedback signal transmitted to the user equipment, or a component thereof, to the user equipment.

* * * * *